(12) United States Patent
Shigehisa et al.

(10) Patent No.: US 6,592,646 B2
(45) Date of Patent: Jul. 15, 2003

(54) METHOD OF PRODUCING DIRECT REDUCED IRON WITH USE OF COAL-DERIVED GAS AND APPARATUS

(75) Inventors: Takuo Shigehisa, Shinagawa-ku (JP); Jinichi Tomuro, Taito-ku (JP); Eiichiro Makino, Minato-ku (JP)

(73) Assignees: Kabushiki Kaisha Kobe Seiko Sho, Kobe (JP); Babcock-Hitachi Kabushiki Kaisha, Tokyo (JP)

(*) Notice: Subject to any disclaimer, the term of this patent is extended or adjusted under 35 U.S.C. 154(b) by 0 days.

(21) Appl. No.: 09/968,978

(22) Filed: Oct. 3, 2001

(65) Prior Publication Data

US 2002/0078795 A1 Jun. 27, 2002

(30) Foreign Application Priority Data

Nov. 8, 2000 (JP) ........................................ 2000-340461

(51) Int. Cl.$^7$ .............................................. C21B 11/00
(52) U.S. Cl. ............................. 75/492; 75/958; 266/156
(58) Field of Search .................... 75/492, 958; 266/156

(56) References Cited

U.S. PATENT DOCUMENTS

| | | | | |
|---|---|---|---|---|
| 3,954,444 A | * | 5/1976 | Wenzel et al. | ................. 75/494 |
| 4,173,465 A | | 11/1979 | Meissner et al. | |
| 4,260,412 A | | 4/1981 | Summers et al. | |
| 5,327,717 A | * | 7/1994 | Hauk | ........................ 60/39.02 |
| 5,514,203 A | * | 5/1996 | Grunbacher et al. | .......... 75/492 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

In a method of producing direct reduced iron with use of a coal-derived gas, coal is heated to lower the moisture thereof, and the moisture-lowered coal is gasified in a coal gasification furnace to produce a coal-derived gas containing a reducing gas. The reducing gas is then utilized to reduce iron ore in an iron ore reducing furnace. With use of an exhaust gas from the iron ore reducing furnace, the coal is heated in the step of heating coal.

19 Claims, 6 Drawing Sheets

METHOD OF PRODUCING DIRECT REDUCED IRON WITH USE OF COAL-DERIVED GAS AND APPARATUS

BACKGROUND OF THE INVENTION

1. Field of the Invention

This invention relates to a method of producing direct reduced iron with a gas obtained by coal gasification, and more particularly to a direct reduced iron producing method provided with steps of gasifying coal to a coal-derived gas containing a reducing gas, and reducing iron ore by the reducing gas to produce reduced iron.

2. Description of the Related Art

Production of reduced iron has been widespread because a plant for direct reduction of iron ore can be built at relatively low cost and easily operated. In addition, such a production can be economically practical even with a small-scaled plant. It is a common practice of using natural gas as a fuel (also as a reducing agent) for the production. Specifically, it has been a customary practice to reform natural gas into synthesis gas by $H_2O$ or $CO_2$ so as to reduce iron ore by the synthesis gas.

Synthesis gas having substantially the same ingredients as the above synthesis gas can be produced by gasifying coal in a furnace designed for coal gasification. Synthesis gas produced by gasifying coal (hereinafter, referred to as "coal-derived gas") contains reducing gas consisting of CO and $H_2$ as main ingredients, and $CO_2$, $H_2O$, $H_2S$, etc. as sub ingredients.

Since the reduced iron production consumes a large volume of fuel, it is often the case that plants for reduction of iron ore are built close to fields of fuel (around gas fields). However, potential demands for producing reduced iron by using coal as a fuel (also as a reducing agent) instead of natural gas cannot be neglected especially in a region where inexpensive natural gas is hard to obtain but abundant coal is available. Particularly, producing direct reduced iron with use of coal-derived gas is regarded as a most practical technology because each process thereof is performed in a satisfactorily sophisticated manner. As a matter of fact, constructing parties and builders of plants for producing reduced iron researched processes of producing direct reduced iron with use of coal-derived gas. The results of their research were disclosed in T. A. Lepinski, M. R. Jones, Iron and Steel Engineer, Oct. 1982, pp. 23–28, P. E. Duarte, E. O. Gerstbrein, H. Smegal, Proceedings, AIC Conferences 3rd Annual Asian Steel Summit, 1997. This fact reveals that interest is increasing in this technical field.

However, a commercial plant aiming at producing direct reduced iron with use of coal-derived gas has not yet been put into practice. This is because building such a plant involves economical problems since invariable cost (fixed cost) such as construction cost for a coal gasification furnace and peripheral facilities is high. The fixed cost has not been successfully suppressed because each of the production processes are sophisticated and cannot be further simplified. Therefore, in order to lead this technology to a commercial success, required is an idea of suppressing variable cost by (a) reducing fuel cost due to improvement of heat efficiency or (b) utilizing inexpensive coal resources which has not been available in the conventional technology.

Considering (a) improvement of heat efficiency in producing direct reduced iron with use of coal-derived gas, the most important matter is how to utilize waste heat resulting from (A) coal-derived gas and (B) exhaust gas emitted from top part of a furnace for reducing iron ore (hereinafter, simply referred to as "top gas"). Waste heat obtained from coal-derived gas (A) and top gas (B) each amounts to 200 to 400 kcal per kg of reduced iron (namely, in terms of calorie per 1 kg of reduced iron product, 200 to 400kcal=200× 4.18605 to 400×4.18605 kJ=836 to 1672 kJ). The sum of waste heating value of coal-derived gas (A) and top gas (B) occupies about 20% with respect to the sum of the theoretical heating value requirement for producing the reduced iron and the waste heating value throughout the production processes.

It is desirable to perform hot feeding of coal-derived gas (feeding coal-derived gas to a predetermined facility such as a furnace for reducing iron ore at a sufficiently high temperature without being cooled to an atmospheric temperature) in order to most efficiently utilize waste heat obtained from coal-derived gas (A). On the other hand, taking into account an adverse affect that sulfur compounds such as $H_2S$ contained in coal-derived gas may impart to quality of resultant reduced iron product, it is desirable to desulfurize coal-derived gas. In view of these, it is desirable to perform hot desulfurization with respect to coal-derived gas (namely, desulfurizing coal-derived gas at a sufficiently high temperature suitable for desulfurization without cooling the gas to an atmospheric temperature).

As to the idea of how to utilize waste heat derived from top gas (B), it is required to fabricate a novel heat recovery system for the top gas (B) having relatively low pressure and temperature.

The following technology has been provided with respect to hot feeding and hot desulfurization of coal-derived gas (A). Specifically, U.S. Pat. No. 4,260,412 proposes an idea of obtaining coal-derived gas in a fluidized bed gasification furnace internally equipped with a desulfurizer and performing hot feeding of gas to an iron ore reducing furnace by way of a reheating furnace. U.S. Pat. No. 4,173,465 does not disclose a specific type of gasification furnace but suggests a process of hot desulfurizing coal-derived gas (desulfurization out of a furnace) on a movable bed of limestone. In any case, mixing coal-derived gas with top gas (B) which has been cleaned and cooled (hereinafter, referred to as "recirculating gas") enables to lower the temperature of the coal-derived gas to a suitable level for hot desulfurization. This is conceived one of the effective and economical techniques of utilizing waste heat derived from coal-derived gas from the viewpoint of heat balance because sensible heat resulting from coal-derived gas is directly utilized in the process.

However, neither U.S. Pat. Nos. 4,260,412 nor 4,173,465 discloses the idea of utilizing top gas (B).

Top gas (B) has such a large fluid rate as 1.5 to $3Nm^3$ per kg of reduced iron product, but has a relatively low temperature and pressure (about 400° C. and 2 bar), respectively. Specifically, since the temperature of the gas (B) is relatively low despite its large calorific capacity as a heat source, it is not easy to recover heat from the gas. Although the heat recovery can be attained by a heat exchange between the top gas and recirculating gas in order to meet heat balance in the process, the efficiency of such a heat exchange is considerably low due to low gas-to-gas heat transfer coefficient. Therefore, an expensive heat exchanger having a satisfactorily large heat transmission area is required. Even in the technical field of producing direct reduced iron with use of natural gas which has been primarily conducted nowadays, the heat recovery from top gas has been given up in most of the cases. However, there is a need of finding an effective heat recovery in the field of producing direct reduced iron with use of gas obtained by coal gasification. In this field, suppressing variable cost is a more significant task.

Regarding effective use of waste heat derived from coal-derived gas (A), both of U.S. Pat. Nos. 4,260,412 and 4,173,465 disclose direct cooling by mixing with recirculating gas to set the temperature of the coal-derived gas to a suitable temperature for hot desulfurization (400 to 900° C.). This is one of the inexpensive and effective waste heat utilizing techniques as mentioned above. However, neither U.S. Pat. No. 4,260,412 nor 4,173,465 discloses effective measures for a case that a pressure in the gasification furnace is greater than that in the iron ore reducing furnace.

Reduced iron production plants currently under operation produce about 500,000 ton/year as a minimum unit on a commercial scale. In view of this, it is required to build a gasification furnace capable of producing coal-derived gas as much as 50,000 Nm$^3$/h. Presumably, such a large-scaled gasification furnace is expected to have a pressure of 10 to 30 bar, which is exceedingly higher than that in the iron ore reducing furnace (about 2 bar). Such an exceedingly high pressure in the gasification furnace may involve the following problems.

In the case of a fluidized bed gasification furnace in which desulfurization is performed as disclosed in U.S. Pat. No. 4,260,412, it is necessary to draw vapor or part of recirculating gas into the fluidized bed gasification furnace to keep inside the furnace at a temperature around 800° C. which is suitable for desulfurization. In the case where vapor is introduced, gas after the vapor introduction has a lower gaseous ratio of $[(CO+H_2)/(CO_2+H_2O)]$ than what is necessary in the iron ore reducing furnace. Accordingly, reduction power of the resultant gas is not sufficient, thereby obstructing direct feeding of such a gas having a lowered reduction power to the iron ore reducing furnace.

On the other hand, in the case where recirculating gas is introduced into the fluidized bed gasification furnace, a higher pressure in the gasification furnace requires introduction of recirculating gas in a pressurized state. This may increase compression power of recirculating gas. It should be noted that the aforementioned gaseous ratio of a make-up coal-derived gas (i.e., a coal-derived gas continuously supplied to the system) itself may be desirably set to 2 or more, although the ratio can be increased by mixing with recirculating gas in the fluidized bed gasification furnace.

In the case of performing desulfurization outside the furnace as disclosed in U.S. Pat. No. 4,173,465, the following drawback may occur. Specifically, it is necessary to mix recirculating gas in a pressurized state with coal-derived gas in order to set the temperature of the coal-derived gas at a suitable level for desulfurization. Namely, if a pressure in the gasification furnace is high, the pressure of the coal-derived gas is raised with the result that compression power of the recirculating gas is raised. In view of this, it is necessary to depressurize the coal-derived gas prior to mixing with recirculating gas to avoid such undesirable compression power rise. However, it is not easy to depressurize the coal-derived gas which has a high temperature. It is required to pre-cool the coal-derived gas to a temperature necessary for desulfurization, prior to depressurizing. Temperature control for such pre-cooling is conceived to occupy a large portion of temperature adjustment throughout the process. However, U.S. Pat. No. 4,173,645 is silent about measures for such a temperature adjustment as required for pre-cooling. There is proposed an idea of installing a waste heat boiler for pre-cooling. However, this does not provide an economical solution, nor does it provide a solution for improving heat efficiency.

Furthermore, neither U.S. Pat. No. 4,260,412 nor 4,173,465 explicitly recites pre-processing of coal. However, the following problems are involved concerning pre-processing of coal. In the case where coal has a low degree of carbonization and a high moisture (i.e., low-grade or B-grade coal), resultant gas obtained by gasification of low-grade coal has a low gaseous ratio. Even if hot desulfurization is performed in a desirable manner, reduction power of gas obtained from gasification of the low-grade coal is insufficient. It is difficult to perform direct hot feeding of such a gas to an iron ore reducing furnace. Accordingly, the low-grade coal cannot be used as it is. As mentioned above, developing a technology of utilizing low-grade coal which has a low carbonization and high moisture and therefore is available at an inexpensive cost is one of significant tasks in order to suppress variable cost due to (b) utilization of inexpensive coal resources, which has not been accomplished in the conventional technology. Low-grade coal is coal such as sub-bituminous coal, brown coal, and peat which have high moisture resulting from low degree of carbonization.

SUMMARY OF THE INVENTION

In view of the above problems residing in the prior art, an object of this invention is to provide a method of producing direct reduced iron with use of a coal-derived gas having an improved heat efficiency and improved economical effect.

More specifically, it is an object of this invention to provide a method of producing direct reduced iron with a coal-derived gas that enables to efficiently utilize waste heat derived from a top gas (B) as well as utilizing coal having a low degree of carbonization and a high moisture. It is still another object of this invention to provide a method of producing direct reduced iron with a coal-derived gas that enables to efficiently utilize waste heat derived from a coal-derived gas (A) even in a case where a pressure in a gasification furnace is higher than that in a furnace for reducing iron ore.

According to an aspect of this invention, a method of producing direct reduced iron with use of a coal-derived gas includes steps of heating coal to lower the moisture of the coal; gasifying the moisture-lowered coal in a coal gasification furnace to produce a coal-derived gas containing a reducing gas; and reducing iron ore by utilizing the reducing gas in an iron ore reducing furnace. In the step of heating coal, the coal is heated with use of an exhaust gas from the iron ore reducing furnace.

With this arrangement, the heat efficiency can be enhanced by utilizing the waste heat derived from the exhaust gas from the iron ore reducing furnace and by adjusting the moisture of coal to be gasified.

In the method, the coal-derived gas is desirably depressurized by a power recovery apparatus and the depressurized coal-derived gas is fed to the iron ore reducing furnace. This also can enhance the heat efficiency by utilizing the waste heat of the coal-derived gas.

It is also preferable that the exhaust gas from the iron ore reducing furnace that has been used for the lowering coal moisture is purified by removing non-reducing gas therefrom to obtain a recirculating gas and part of the recirculating gas is mixed with the depressurized coal-derived gas prior to being fed to the iron ore reducing furnace. Such a mixing is advantageous because the depressurized coal-derived gas can be cooled to a suitable temperature for the following process.

Moreover, the depressurized coal-derived gas is preferably subjected to hot desulfurization prior to being fed to the iron ore reducing furnace. More preferably, the mixed gas of the depressurized coal-derived gas and the recirculating gas is subjected to this desulfurization.

Part of the recirculating gas may be mixed with the coal-derived gas prior to being depressurized. This can lower the gas temperature to a suitable temperature for the depressurizing.

In the step of heating coal, the exhaust gas from the iron ore reducing furnace can be utilized directly or indirectly. The coal may be heated by a direct contact with the exhaust gas from the iron ore reducing furnace. Alternatively, the exhaust gas from the iron ore reducing furnace heats another gas due to a heat exchange therebetween and, in the step of heating coal, the coal is heated by a contact with the heated another gas. It is also possible that: the exhaust gas from the iron ore reducing furnace is purified by removing non-reducing gas therefrom to obtain a recirculating gas, part of the recirculating gas is used as a fuel in a reheating furnace for reheating of the coal-derived gas so as to feed the reheated coal-derived gas to the iron ore reducing furnace and, in the step of heating coal, the coal is heated by a contact with a gas exhausted from the reheating furnace.

According to another aspect of this invention, a method of producing direct reduced iron with use of a coal-derived gas includes steps of gasifying coal in a coal gasification furnace to produce a coal-derived gas containing a reducing gas; depressurizing the coal-derived gas by a power recovery apparatus; and reducing iron ore by utilizing the reducing gas in the depressurized coal-derived gas in an iron ore reducing furnace.

According to a further aspect of this invention, a system for producing direct reduced iron with use of a coal-derived gas includes a moisture adjuster which lowers the moisture of coal; a coal gasification furnace which gasifies the moisture-lowered coal to produce a coal-derived gas containing a reducing gas; an iron ore reducing which reduces iron ore by utilizing the reducing gas; and an exhaust gas utilizer which utilizes an exhaust gas from the iron ore reducing furnace for lowering the coal moisture.

It is preferred that the system further includes a power recovery apparatus provided between the coal gasification furnace and the iron ore reducing furnace for depressurizing the coal-derived gas. The power recovery apparatus desirably includes an expansion turbine.

The exhaust gas utilizer may include a gas passage which allows the exhaust gas to flow into the moisture adjuster from the iron ore reducing furnace. Alternatively, it may include a heat exchanger which transfers the heat of the exhaust gas to another gas and a gas passage which allows the another gas to flow into the moisture adjuster from the heat exchanger. In these cases, the system preferably has a gas cleaner which purifies the exhaust gas that has been utilized by the exhaust gas utilizer; a mixer which mixes the coal-derived gas depressurized by the power recovery apparatus with part of the cleaned gas; a desulfurizer which desulfurizes the mixed gas; a reheating furnace which heats the desulfurized gas; and a gas supplier which supplies the heated gas into the iron ore reducing furnace.

It is also possible that the system has a gas cleaner which purifies the exhaust gas from the iron ore furnace; a mixer which mixes the coal-derived gas depressurized by the power recovery apparatus with part of the cleaned gas; a desulfurizer which desulfurizes the mixed gas; a reheating furnace with a burner, in which the de-sulfurized gas is heated by the burner; and a gas supplier which supplies the heated gas into the iron ore reducing furnace. In this case, the exhaust gas utilizer may include a first gas piping which allows another part of the cleaned gas to flow from the gas cleaner into the burner of the reheating furnace so as to use the another part of cleaned gas as a fuel; and a second gas piping which allows a gas exhausted from the reheating furnace to flow from the reheating furnace into the moisture adjuster.

Moreover, the system can have a gas cleaner for purifying the exhaust gas from the iron ore furnace that has been utilized by the exhaust gas utilizer; a mixer which mixes the coal-derived gas produced in the coal gasification furnace with part of the cleaned gas; and a gas supplier which supplies the mixed gas into the power recovery apparatus.

According to a still further aspect of the present invention, a system for producing direct reduced iron with use of a coal-derived gas includes a coal gasification furnace which gasifies coal to produce a coal-derived gas containing a reducing gas; a power recovery apparatus which depressurizes the coal-derived gas; and an iron ore reducing furnace which reduces iron ore by utilizing the depressurized gas.

These and other objects, features and advantages of the present invention will become more apparent upon a reading of the following detailed description and accompanying drawing.

DETAILED DESCRIPTION OF THE PREFERRED EMBODIMENTS OF THE INVENTION

This invention is implemented in an exemplified manner as mentioned below.

First, moisture-adjusted coal is fed to a coal-gasification furnace to gasify the coal to produce a synthesis gas containing a reducing gas (an initial coal-gasification process). The synthesis gas is referred to as "coal-derived gas" hereinafter.

Next, the coal-derived gas is depressurized by a power recovery apparatus, and the depressurized gas is fed to a furnace for reducing iron ore where iron ore is reduced by using the reducing gas contained in the coal-derived gas (an iron ore reduction process). Simultaneously, an exhaust gas emitted from the iron ore reducing furnace (namely, top gas) is fed to a vessel in which coal has been placed for adjusting a moisture thereof. When the top gas is fed to the container, the coal has its moisture adjusted by utilizing the exhaust gas as a heat source (a moisture adjusting process).

Subsequently, the moisture-adjusted coal is fed to the gasification furnace to gasify the coal to a coal-derived gas containing a reducing gas (a main coal-gasification process). The iron ore reduction process and the moisture adjusting process are performed in a similar manner as mentioned above. Then, the main coal gasification process, the iron ore reduction process, and the moisture adjusting process are repeated sequentially.

Hereinafter, operations and effects of this invention are described.

According to an aspect of this invention, provided is a method of producing direct reduced iron with use of a coal-derived gas including a coal gasification step of gasifying coal in a coal gasification furnace to produce a coal-derived gas containing a reducing gas, and an iron ore reduction step of reducing iron ore by utilizing the reducing gas in a furnace for reducing iron ore. The method comprises a moisture adjusting step of adjusting a moisture of the coal by utilizing, as a heat source, an exhaust gas from the iron ore reducing furnace (i.e., tog gas).

With this arrangement, waste heat derived from the top gas (B) can be efficiently used in moisture adjustment of the coal. Further, adjusting moisture decreases the water content contained in the coal having a low degree of carbonization and a high moisture. Thus, such coal treated with the inventive method can be utilized in a desirable manner. Details of this method are described below.

The adjustment of the coal moisture needs a sufficient energy mainly for vaporizing water (latent heat of vaporization). Thus, waste heat derived from the top gas (exhaust gas from an iron ore reducing furnace) is suitable for such an adjustment because it is large in amount but low in temperature. Conventionally, heat recovery from the top gas has not been economical because required is an expensive heat exchanger having a large heat transmitting area due to its low heat transfer coefficient for heat exchanging between gas and gas. However, in case that the waste heat is used for moisture adjustment of coal, it is possible to perform direct heat exchange in which coal is rendered in direct contact with the top gas. Employing this technique provides further economical efficiency.

In addition to this, moisture adjustment of coal with waste heat derived from a top gas enables to save a remarkably larger amount of energy than the recovered energy amount to be used for the moisture adjustment of coal. Therefore, although recovering energy needs an extra cost of equipment and the like, such an extra cost can be substantially reduced due to the above-mentioned remarkable improvement of the gasification efficiency (this effect is described later in detail).

Generally, attaining a high temperature of 1000° C. or more in the gasification furnace is necessary to promote ash melting and coal gasification reaction. Waste water component may generate such gas as $CO_2$ and $H_2O$ which is unnecessary for reducing iron ore. The unnecessary gas may likely to accumulate waste heat resulting from coal-derived gas or cause excessive reforming of vapor (i.e., $C+H_2O \rightarrow CO+H_2$), resulting in a thermal loss of both sensible heat and latent heat. Consequently, coal consumption amount may increase. Using waste heat, which has not been used in the conventional technology, with an attempt to adjust the moisture of the moisture-adjusted coal at an optimal level is effective in the aspect of energy saving. As will be described later, the inventors of this application found that, as a result of investigating a correlation between moisture adjustment of raw material coal and composition of coal-derived gas, as well as heat balance, implementing the inventive method enables to accomplish energy saving effect to such a degree as about 2 times as large as the heat recovered for moisture adjustment.

It is required to remove water component from coal-derived gas because excessive moisture in the raw material coal beyond a predetermined amount (for instance, 20 to 30 mass %) may result in excessive rise of partial pressure of $H_2O$ in the coal-derived gas [namely, gaseous ratio: $(CO+H_2)/(CO_2+H_2O)$ becomes insufficient]. In such a case, it is necessary to cool coal-derived gas, which would make it impossible to perform hot feeding for the purpose of energy efficiency improvement. In other words, utilization of low-grade coal having a large amount of water component may be obstructed. On the other hand, adjusting moisture of raw material coal by waste heat derived from a top gas enables to attain a required gaseous ratio as well as securing coal-derived gas capable of hot feeding. Thus, according to the inventive method, low-grade coal having a high moisture, which has not been usable in the conventional technology, can be used.

As mentioned above, using waste heat derived from top gas for moisture adjustment of coal enables to decrease unit requirement of coal by an amount greater than that corresponding to the calorie recovered by moisture adjustment. Thus, this technique enables to utilize coal having a high moisture while securing efficient heat utilization. In addition, since top gas is substantially devoid of oxidizing gas, there can be eliminated a problem that the coal may be oxidized during its moisture adjustment.

According to another aspect of this invention, provided is a method of producing direct reduced iron with a gas obtained by gasifying coal including a coal gasification step of gasifying coal in a gasification furnace to produce a coal-derived gas containing a reducing gas, and an iron ore reduction step of reducing iron ore by utilizing the reducing gas in a furnace for reducing iron ore. The method comprises steps of depressurizing the coal-derived gas produced in the gasification furnace by a power recovery apparatus and feeding the depressurized coal-derived gas to the iron ore reducing furnace.

With this arrangement, coal-derived gas (synthesis gas produced in the gasification furnace, namely, synthesis gas produced by coal gasification) has its pressure reduced (is depressurized) by a power recover apparatus to feed the depressurized coal-derived gas to an iron ore reducing furnace. Part of energy resulting from the coal-derived gas is recovered as a power to depressurize the coal-derived gas by the power recovery apparatus, thereby resultantly being recovered as an electric power (electric energy).

With this arrangement, even if a pressure in the gasification furnace is higher than that in the iron ore reducing furnace, a recirculating gas, i.e., a gas obtained by purifying an exhaust gas emitted from the iron ore reducing furnace, can be mixed with the coal-derived gas without compressing the recirculating gas because the coal-derived gas has been supplied in a depressurized state. Thus, a temperature of the mixed gas can be controlled. In other words, waste heat (sensible heat) derived from coal-derived gas can be directly used in the iron producing process. In this way, according to the inventive method, waste heat derived from coal-derived gas (A) can be effectively utilized even in a case where a pressure in the gasification furnace is higher than that in the iron ore reducing furnace. Operations and effects of this step are described in detail in the following section by taking an example of desulfurizing coal-derived gas.

Coal-derived gas (synthesis gas produced by coal gasification) contains sulfur compounds such as $H_2S$ derived from sulfur in the coal. A larger content of sulfur compound may deteriorate more severely the quality of reduced iron obtained in the iron ore reducing furnace. Therefore, it is often the case that a coal-derived gas is subjected to hot desulfurization prior to being fed to the iron ore reducing furnace. In such a case, the coal-derived gas is generally too hot to be subjected to the hot desulfurization. Specifically, the temperature of the coal-derived gas is 1000° C. or higher, whereas the desirable range for the hot desulfurization is 400 to 900° C. depending on the kind of desulfurizing technique or the type of desulfurizer (desulfurizing agent). In view of this, it is required to cool the coal-derived gas to an appropriate temperature in order to perform hot desulfurization in a desirable manner. Cooling the coal-derived gas according to heat exchange by a waste heat boiler or its equivalent is not only uneconomical but also undesirable because energy loss due to heat exchange is unavoidable. It is most preferable in the aspect of heat efficiency to perform heat adjustment by mixing a coal-derived gas with a cleaned and washed recirculating gas as disclosed in the aforementioned U.S. Pat. No. 4,260,412. However, since coal-derived gas is a high-pressurized gas, it is necessary to increase the pressure of a recirculating gas for mixing therewith (namely, raise pressure by compression). In view of the above, this invention proposes decreasing a pressure (depressurizing) of coal-derived gas by a power recovery apparatus in order to eliminate such a step, which is an essential feature of the second aspect of this invention.

Depressurizing a coal-derived gas by a power recovery apparatus as mentioned above eliminates need of compressing a recirculating gas prior to temperature adjustment for mixing with the coal-derived gas. Namely, this arrangement enables to obtain a coal-derived gas at an appropriate temperature without compressing a recirculating gas. Further, this arrangement enables to recover part of energy from a coal-derived gas when depressurizing the coal-derived gas by a power recovery apparatus as a power which is resultantly transformed to electric power. Thus, heat recycling is accomplished.

Simply depressurizing a high-temperature gas like a coal-derived gas (decreasing pressure without energy recovery) is not only waste of energy but also involves a technical problem such as difficulty in obtaining a suitable material for a pressure-reducing valve. These problems can be solved by employing an expansion turbine as a power recovery apparatus.

According to a still further aspect of this invention, in the case where it is difficult or undesirable to directly feed a coal-derived gas to the power recovery apparatus considering the materials of the elements constituting the power recovery apparatus, it may be preferable to mix the coal-derived gas with part of a purified gas (recirculating gas) obtained by purifying an exhaust gas emitted from the iron ore reducing furnace (i.e., removing non-reducing gas from the exhaust gas), prior to depressurizing the coal-derived gas by the power recovery apparatus. The mixing lowers the temperature of the coal-derived gas to feed the cooled coal-derived gas to the power recovery apparatus. At this time, it is necessary to compress the recirculating gas before mixing with the coal-derived gas. The method of compression is not limited to a specific one. However, it is preferable in the aspect of energy saving to provide a coaxial compressor as the power recovery apparatus and compress the recirculating gas by the compressor for mixing with the coal-derived gas. This makes possible to utilize energy which has been generated when reducing the pressure of the coal-derived gas by the power recovery apparatus.

As the power recovery apparatus, various kinds can be used, but an expansion turbine may be preferably used. Use of an expansion turbine is advantageous in that pressure-energy of a high-pressurized coal-derived gas can be recovered as well as recovering part of temperature-energy (sensible heat) as a power. In such a case, it is highly likely that dust which has been contained at a high concentration in the coal-derived gas may cause abrasion or the like of wings of the turbine. Accordingly, it is desirable to remove dust of larger particle diameters which may cause abrasion of the wings or the like by using a dust remover such as a cyclone.

The coal moisture may be adjusted (lowered) by direct or indirect heating with using the exhaust gas from the iron ore reducing furnace as a heat source in the coal moisture adjustment process. Namely, according to a still further aspect of this invention, moisture adjustment may be performed by direct heating of coal with the exhaust gas. Alternatively, it may be performed by indirect heating with the exhaust gas, in which the other gas such as a recirculating gas is heated due to a heat exchange with the exhaust gas and then the coal is heated by the heated gas to adjust its moisture, or in which the exhaust gas is purified, part of the purified gas (i.e. recirculating gas) is used as a fuel for heating a reducing gas in a reheating furnace and then the exhaust gas from the reheating furnace heats the coal to adjust its moisture. The latter indirect heating is effective when the exhaust gas from the iron ore reducing furnace includes dust particles at high concentration. This is because such an indirect heating prevents the particles from being carried along with coal into a coal gasification furnace, resulting in avoiding damage of the gasification furnace due to the inclusion of a part of the particles.

In this invention, adjusting moisture of coal means controllably decreasing the moisture of coal, adjusting temperature of gas means controllably lowering the temperature of gas, and depressurizing gas means controllably lowering the pressure of gas. Pressure (unit: bar) is an absolute pressure (unit: bar). Normal pressure of the iron ore reducing furnace is about 2 bar, but not limited thereto. The pressure may be set at 10 bar or less.

Figure 1:
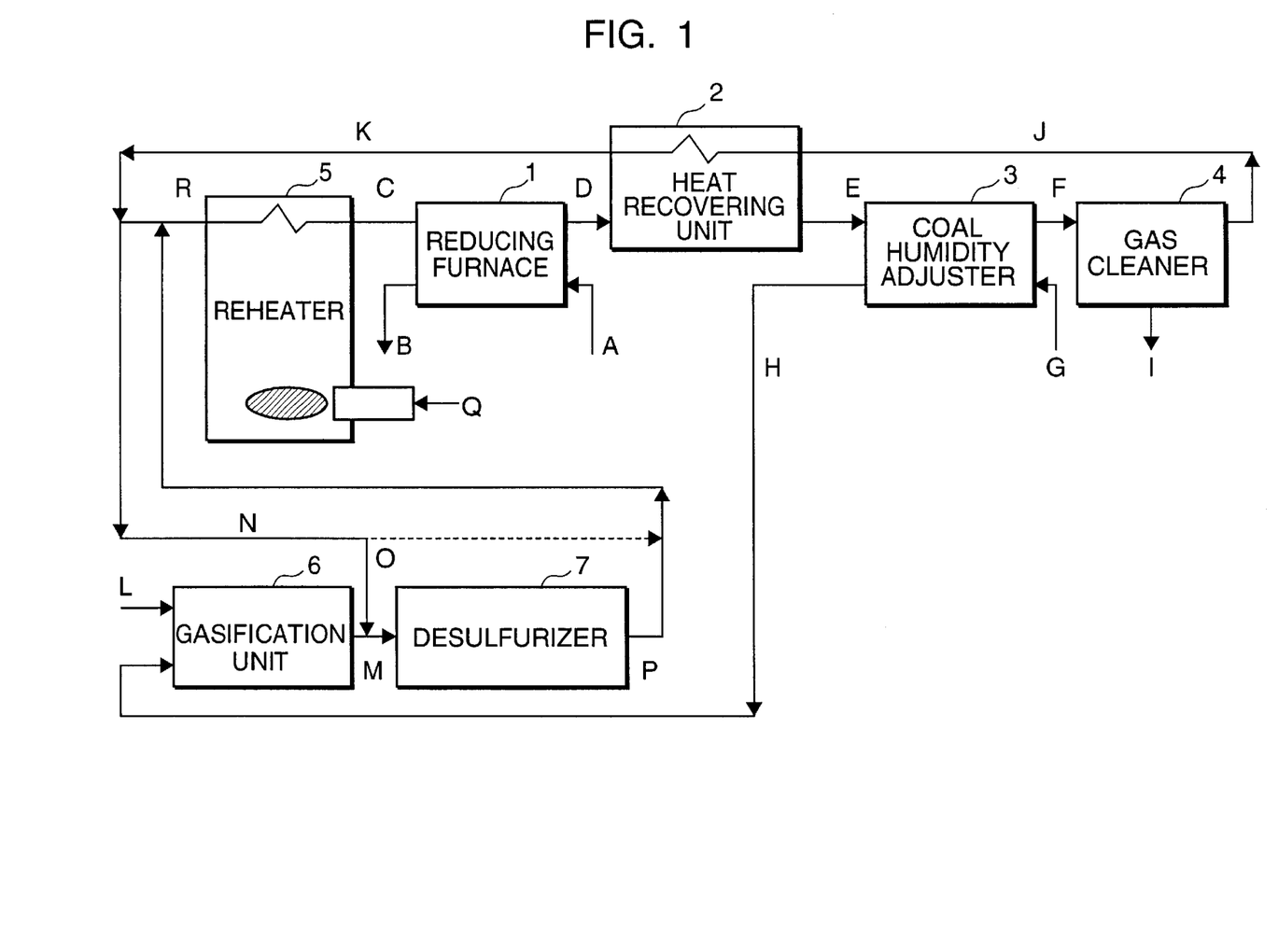
FIG. 1 is a diagram showing a series of processes exemplifying a direct reduced iron producing method with use of coal-derived gas according to this invention.

The inventive direct reduced iron producing method is implemented according to a process as exemplified in FIG. 1. The process shown in FIG. 1 is described below.

Iron ore A is fed to a reducing furnace (iron ore reducing furnace) 1, and contacted with coal-derived gas C containing CO and $H_2$ (reducing gas) of about 900° C. as main ingredients for reduction, whereby reduced iron B ($Fe_2O_3$+ $3CO \rightarrow 2Fe+3CO_2$, $Fe_2O_3+3H_2 \rightarrow 2Fe+3H_2O$) is produced. Gas residing around the top of the reducing furnace (top gas D) has a temperature of 300° C. or higher in which CO and $H_2$ still remain. The top gas D is contacted with raw material coal G for direct or indirect heat exchange, thereby obtaining moisture-adjusted coal H (1-step heat recovery). This is performed to efficiently utilize sensible heat of the top gas D. In the case where waste heat derived from the top gas D is more than the heating value necessary for the coal moisture adjustment, the excessive heating value of the waste heat can be used for heating recirculating gas J obtained by cleaning and cooling top gas D. In particular, the top gas D is subjected to the 2-step heat recovery in which it is used for the heat exchange with the recirculating gas J (step 1) and then the remaining heat is used in form of top gas E for the moisture adjustment of coal (step 2). Top gas F after the 1-step or 2-step heat recovery has a lowered reduction potential because the top gas F contains $H_2O$ and $CO_2$. In view of this, a gas cleaning/cooling process is implemented by a gas cleaner 4 to remove unnecessary matters ($CO_2$, $H_2O$, $H_2S$), thereby obtaining recirculating gas J having a high gaseous ratio. On the other hand, make-up coal-derived gas is obtained by feeding moisture-adjusted coal H and oxygen L to a gasification furnace 6. The coal-derived gas M is mixed with recirculating gas J or K (gas obtained by heating the gas J due to heat exchange with the top gas D) by hot feeding the coal-derived gas for efficient use of heat. However, since the gas may contain sulfur compounds such as $H_2S$ which may deteriorate grade of reduced iron product, hot desulfurization is implemented by a hot desulfurizer 7 after gasification by a gasification unit 6. Generally, a temperature for conducting the hot desulfurization is lower than a temperature of the coal-derived gas M. Accordingly, the coal-derived gas M is directly mixed with part of recirculating gas N to adjust temperature of the coal-derived gas M. In the case where the hot desulfurization 7 is executable at a temperature generally the same as that of the coal-derived gas M, it is possible to mix the recirculating gas N with coal-derived gas P after the hot desulfurization to adjust a temperature of the desulfurized coal-derived gas P (see the dotted arrow in FIG. 1). The coal-derived gas P which has undergone the temperature adjustment and desulfurization joins the recirculating gas, and is reheated in heat tubes of a reheating furnace 5, thereby obtaining coal-derived gas C at a temperature of about 900° C. Part of the recirculating gas K or the coal-derived gas P is used as a heat source in a burner of the reheating furnace 5.

[Examples]

A process for producing direct reduced iron with use of coal-derived gas according to a preferred embodiment of this invention is described with reference to FIG. 2.

In order to lower the coal moisture, top gas E obtained by cooling top gas D due to the heat exchange with the recirculating gas was drawn into coal moisture adjuster 3 to come in direct contact with coal. Then, the gas after passing the moisture adjuster 3, top gas F, has unnecessary matters such as $CO_2$, $H_2S$, and $H_2O$ removed by a gas cleaner 4. Before introducing top gas F into the gas cleaner 4, it may be preferable to provide a cooling device and a knock-out pot to remove $H_2O$ so that $H_2O$ and oxidizing gas are separately removed. This prevents $H_2O$ of the top gas F from diluting an adsorbent for adsorbing the oxidizing gas in the gas cleaner 4. Further, since a temperature of coal-derived gas M as it is obtained by gasification of coal material in a gasification furnace is higher than a suitable temperature for hot desulfurization, it is necessary to cool coal-derived gas M. It is effective to partially cool the coal-derived gas M by mixing with recirculating gas. However, such a mixing is difficult, since the coal-derived gas M has a higher pressure than the recirculating gas. Considering this, it may be preferable to depressurize the coal-derived gas M by an expansion turbine 8, and then mix the depressurized coal-derived gas M with recirculating gas N1 for temperature adjustment of the coal-derived gas M. Use of the expansion turbine 8 is effective in that not only mixture with the recirculating gas N1 is feasible but also in that the coal-derived gas M is cooled before hot desulfurization as well as reducing a design-pressure for hot desulfurization.

Normally, the temperature of the coal-derived gas M on the side of the gasification furnace is regulated to approximately 1000° C. which is effective in suppressing adhesion of ash components. However, in the case where there rises a need of further lowering the temperature than the normal level considering the specifications regarding the temperature of the expansion turbine, it is possible to raise the pressure of recirculating gas N2 while recovering heat by activating the expansion turbine 8. In this case, the power recovered with the turbine 8 is used for pressurizing the recirculating gas. The pressurized recirculating gas is then mixed with the coal-derived gas M for temperature adjustment of the coal-derived gas M. This process enables to efficiently utilize waste heat resulting from coal-derived gas as well as utilizing waste heat derived from the top gas of the reducing furnace, which provides excellent heat efficiency.

Figure 6:
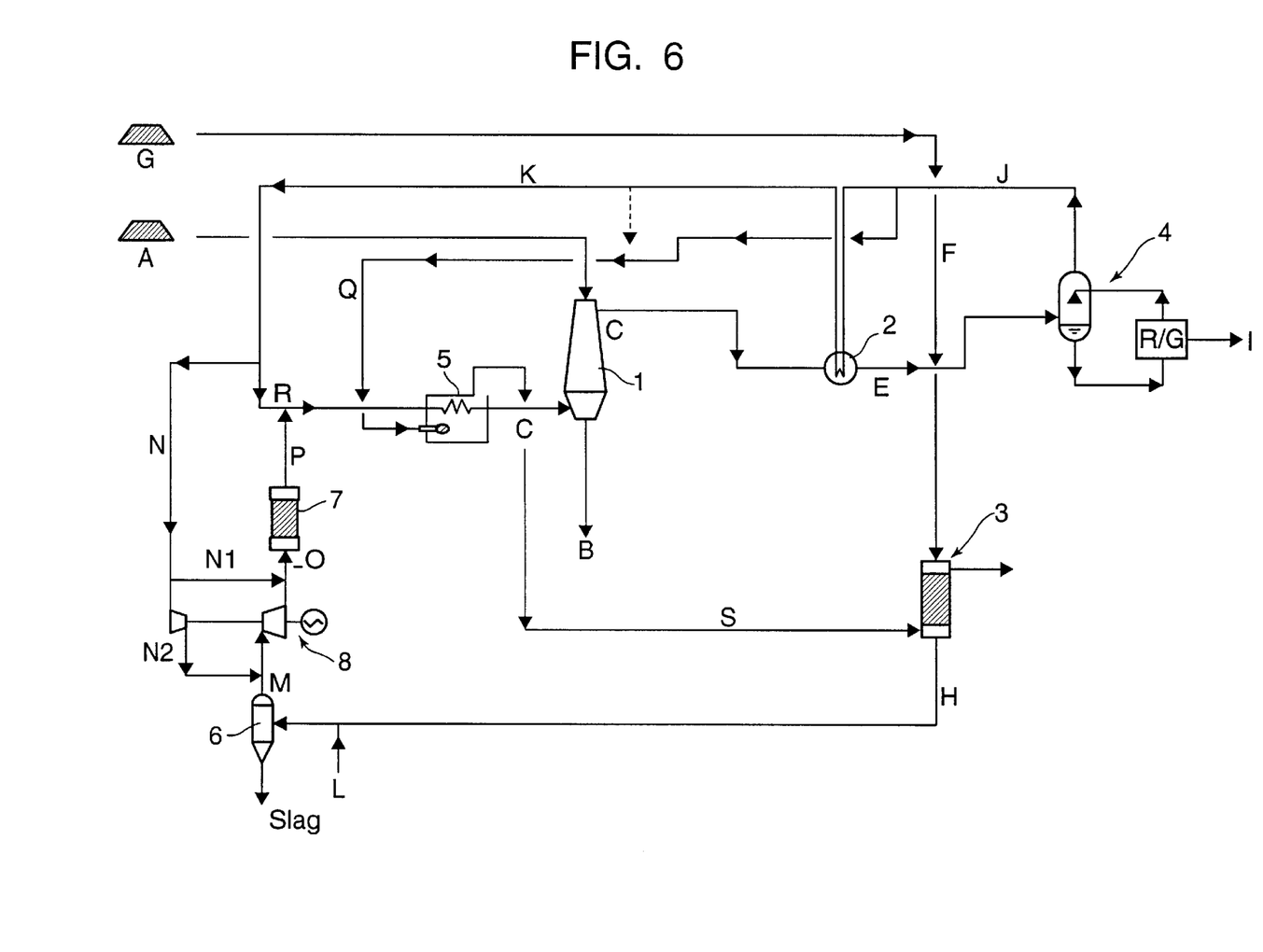
FIG. 6 is a diagram showing another series of processes for utilizing waste heat derived from coal-derived gas as a further inventive example.

When the top gas E includes a large amount of dust particles and thereby not suitable for direct contact with the coal for coal moisture adjustment, another embodiment of this invention shown in FIG. 6 is preferred. In this embodiment, the top gas E is purified in gas cleaner 4 to obtain a recirculating gas and part of the recirculating gas is used as a fuel in a reheating furnace 5. Then, the heated exhaust gas S (i.e., the gas exhausted from the reheating furnace 5) is used for heating the coal in coal moisture adjuster 3 instead of the top gas E of the former embodiment. This makes possible to indirectly utilize the exhaust heat of the top gas E.

Figure 2:
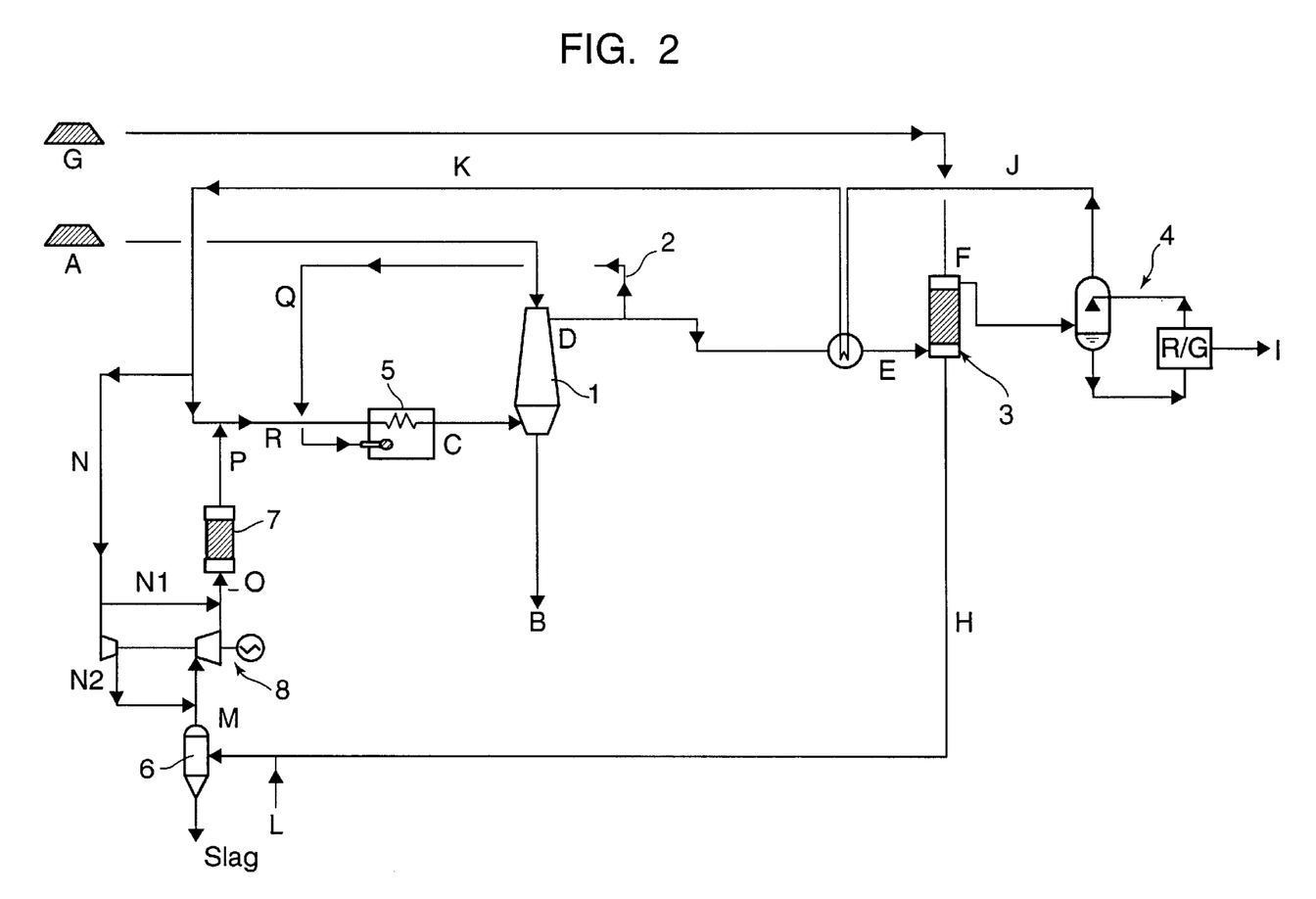
FIG. 2 is a diagram showing a series of processes embodying the direct reduced iron producing method of this invention.

Effects of utilizing heat according to the above processes shown in FIGS. 2 and 6 are described in detail. The operative pressures of the gasification furnace and the iron ore reducing furnace are respectively 30 bar and 3 bar.

Effects of utilizing waste heat derived from top gas of the reducing furnace:

(A) Direct utilization of top gas for coal moisture adjustment (FIG. 2)

Raw coal of B-grade from Indonesia having a moisture of 43 mass % (coal 1), dewatered coal obtained by dehumidifying the raw coal so that its moisture was set to 20 mass % (coal 2), and dewatered coal obtained by dehumidifying the raw coal so that its moisture was set to 10 mass % (coal 3) were gasified in a gasification furnace to obtain coal-derived gases. Composition of each of the resultant gases in the gasification furnace is shown in Table 1. As is obvious from Table 1, the coal-derived gas from coal 1 (moisture: 43 mass %) has a too low gaseous ratio [$(CO+H_2)/(CO_2+H_2O)$] of 0.76. As described above, although the gaseous ratio can be improved by mixing with recirculating gas, it is necessary that the gaseous ratio of the coal-derived gas before the mixture is 2 or more. However, the actual gaseous ratio of the coal derived gas obtained by gasification of coal 1 is extremely smaller than the required one in the iron ore reducing furnace. Accordingly, it is necessary to remove water component from the coal-derived gas to improve the gaseous ratio, which necessitates cooling of the gas and resultantly obstructs hot feeding of the gas. Specifically, as far as an idea of utilizing hot feeding of gas is concerned, the raw coal having a moisture of 43 mass % cannot be used without being subjected to moisture adjustment.

Next, the gaseous ratio of reducing gas ($CO+H_2$) to carbon-containing gas ($CO+CO_2$), i.e., [$(CO+CO_2)/(CO+H_2)$] in Table 1 should be considered. This ratio in Table 1 is proportional to a unit requirement of coal for producing reducing gas (=coal requirement/produced reducing gas). This is because the carbon-containing gas amount ($CO+CO_2$) produced by the gasification is proportional to the coal raw material amount, since carbon is derived only from the coal and all carbon containing in the coal produces CO or $CO_2$. It is clear from Table 1 that the ratio of $(CO+CO_2)/(CO+H_2)$ is remarkably raised by implementing moisture adjustment. For instance, effects of moisture adjustment are evaluated as follows with respect to cases of coal 2 (moisture: 20 mass %) and coal 3 (moisture: 10 mass %). It should be noted that heating value is evaluated in terms of calorie per 1 kg of reduced iron product, and the amount of coal equivalent to the calorie is also shown for easy comparison (1 kg of dried coal=6500 kcal=6500×4.18605 kJ=27200 kJ).

The heating value necessary for moisture adjustment was calculated on the basis of 49 kcal (205 kJ) per kg of reduced iron as shown below. Waste heat derived from top gas of the reducing furnace is recovered as a heat source. Since sensible heat derived from the coal is carried into the gasification furnace, such sensible heat contributes to efficient use of heat.

Calorie necessary for moisture adjustment=sensible heat of coal+sensible heat plus latent heat of water component in coal=0.4 kg×(0.25 kcal/kg.deg×132 deg)+0.4 kg×(0.2/0.8−0.1/0.9)×650 kcal/kg=13+36=49 kcal/kg of reduced iron= 0.0075 of coal per kg of reduced iron.

On the other hand, $(CO+CO_2)/(CO+H_2)$ with respect to the cases of coal 2 (moisture: 20 mass %) and coal 3 (moisture: 10 mass) are respectively 82.3% and 78.8%. The case of coal 3 is superior to the case of coal 2 by 4.3% (=1−78.8/82.3). Performing moisture adjustment before gasification is effective in suppressing coal consumption amount because improved gasification efficiency is expected due to the moisture adjustment, in addition to contribution by sensible heat of coal due to heat exchange. Approximate unit requirement of coal in this process is about 0.4 kg of dried coal per kg of reduced iron. Heating value (calorie) usable by implementing the inventive method equals to calorie corresponding to about 4.3% of the unit requirement of coal plus calorie equivalent to the aforementioned sensible heat. The usable calorie which has been calculated in accordance with the below-mentioned equation is 125 kcal (523 kJ) per kg of reduced iron, which is equivalent to 0.019 kg of coal per kg of reduced iron.

0.4 kg×0.043×6500+13=125 kcal per kg of reduced iron;
0.4 kg×0.043+13/6500=0.019 kg of coal per kg of reduced iron.

To sum up the above, performing heat recovery on the basis of 49 kcal (205 kJ) per kg of reduced iron by moisture adjustment enables to suppress energy consumption for the whole process on the basis of 125 kcal (523 kJ) per kg of reduced iron. This means that the energy to be saved is 1.85 times as much as the recovered energy by the moisture adjustment. As a result, secured is efficient recovery of waste heat derived from top gas of the reducing furnace, which has been considered uneconomical in the conventional technology. Also, the above fact leads to a possibility that the volume (dimensions) of the gasification furnace can be reduced by 4.3% compared to the furnace used in the conventional technology, which also provides an economical effect.

In addition, when effects of moisture adjustment are evaluated with respect to cases of coal 1 (moisture: 43 mass %) and coal 3 (moisture: 10 mass %) in the same manner as the above-mentioned evaluation, it can be found that the energy to be saved is 3 times as much as the recovered energy by the moisture adjustment. This result leads that the volume (dimensions) of the gasification furnace can be reduced by 20% compared to the furnace used in the conventional technology.

According to the inventive method, it is possible to utilize low-grade coal which has not been usable in the conventional technology because of higher moisture. Also, the inventive method provides an energy saving effect which is desirable from an economical viewpoint.

As is obvious from Table 1, the case of coal 3 (moisture: 10 mass %) enables to accomplish energy saving of 25% or more relative to the case of coal 1 (moisture: 43 mass %) in the aspect of oxygen consumption. Thus, the inventive method provides improved economical efficiency.

(B) Indirect utilization of top gas for coal moisture adjustment (FIG. 6)

When the top gas E contains a large amount of duct particles, it is difficult to directly utilize such a gas for the moisture adjustment (pre-drying) of coal or utilize it as a fuel in the reheating furnace 5 for reheating reducing gas. In such a case, instead of direct utilization of sensible heat of the top gas, latent heat of top gas that has been cleaned is desirably used. Particularly part of the cleaned (purified) top gas is used for heating the reducing gas R in reheating furnace 5 as a fuel and then the waste heat exhausted from the reheating furnace 5 is utilized for drying coal. (It should be noted that, in case where the top gas does not have such a large amount of dust particles, most part of the cleaned top gas is returned to the predetermined processes upstream of the iron ore reducing process to recirculates as recirculating gas.) This processes give satisfactorily energy-saving effects described in the followings, although it is not as pronounced as that given from the direct utilization of sensible heat of the top gas in the former case of A.

The heating value necessary for reheating reducing gas in the reheating furnace was calculated as shown below, when the reducing gas amount per kg of reduced iron is 1.8 $Nm^3$.

1.8×0.31(kcal/$Nm^3$)×(850−500)≈200 kcal/kg of reduced iron

When the cleaned top gas has a heating value of 2000 kcal/$Nm^3$, the requirement of the cleaned top gas for the reheating is 0.125 $Nm^3$/kg of reduced iron as shown below, under the condition that the heat efficiency is an ordinary value of 80%, $$200/0.8/2000=0.125$$

When a combustion temperature of the cleaned top gas in the reheating furnace is considered as 1500° C., a temperature of the exhaust gas from the reheating furnace is about (1500× (1−0.8))=300° C.

In case that the temperature of the exhaust gas from the reheating furnace is set to 400° C. in order to make usable the heat thereof, the heat efficiency decreases to 1−400/1500 73 %. Thus, the temperature control gives a thermal loss of 200/0.73−200/0.8=17 kcal/kg of reduced iron.

On the contrary, when the exhaust gas from the reheating furnace is used for coal moisture adjustment on the condition that a moisture adjustment pressure is 1 atm and thereby a moisture adjustment temperature is 100° C., the usable heating value is 50 kcal/kg of reduced iron as shown below, which is beyond the above-calculated heating value necessary for coal moisture adjustment.

2000×0.125×(1−0.73)×(400−100)/400=50 kcal/kg of reduced iron >49 kcal/kg of reduced iron (=heating value necessary for the moisture adjustment)

Thus, the heating value exhausted from the reheating furnace can cover all of the heating value necessary for the moisture adjustment. The heating value usable by performing the moisture adjustment is 125 kcal/kg of reduced iron as in case with the direct utilization of top gas sensible heat. Even considering the above-calculated thermal loss, this indirect utilization of top gas still makes a heating value of 125−17=108 kcal/kg of reduced iron usable. In other words, it still enables to suppress energy consumption for the whole process on the basis of 108 kcal per kg of reduced iron.

Figure 3:
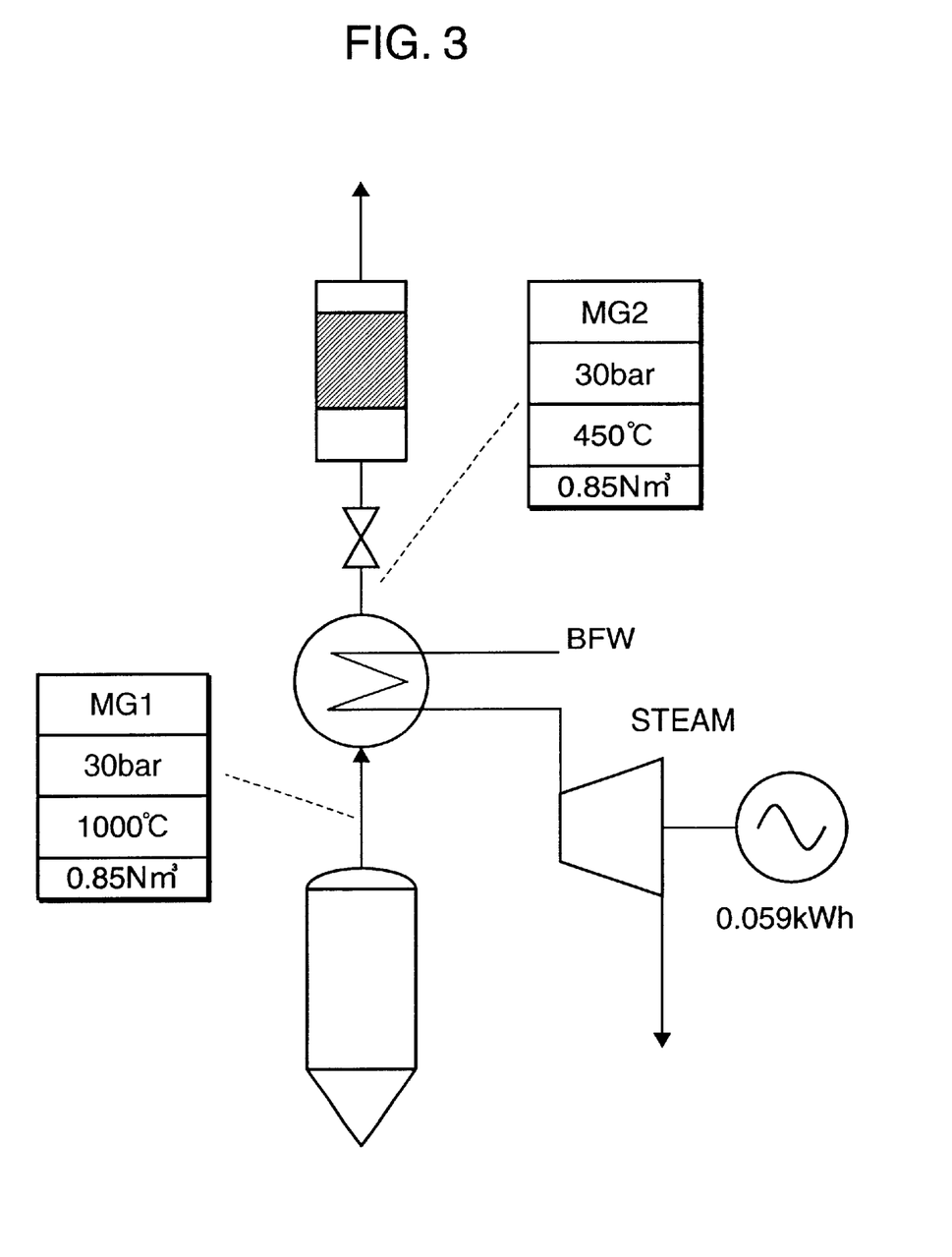
FIG. 3 is a diagram showing a series of processes for utilizing waste heat derived from coal-derived gas as a comparative example.

Effects of utilizing waste heat derived from coal-derived gas:

① Heat balance in the case where heat is recovered by a boiler, namely, a case where heat is recovered by heat exchange with a boiler for cooling coal-derived gas is shown in FIG. 3 as a comparative example, and evaluated as follows. In FIG. 3, unit requirement of coal-derived gas is about 0.85 Nm$^3$ per 1 kg of reduced iron. Heat balance is calculated based on this unit. In the comparative example, a temperature of the coal-derived gas is set to 1000° C., and a temperature for performing hot desulfurization is set to 450° C.

Coal-derived gas of 1000° C. is cooled to 450° C. by a waste heat boiler. Quantity of heat which is expected to be recovered is 145 kcal (607 kJ) per 1 kg of reduced iron when a specific heat of the coal-derived gas is 0.31 kcal/Nm$^3$ deg (=7 kcal/kg−mol·deg). Then, electric power of 0.059 kWh is recovered when the power generation efficiency of a steam-operated turbine connected to the boiler is 35%. The electric power is calculated according to the following equation.

0.85 Nm$^3$×0.31×(1000−450)/(860/0.35)=145/2450=0.059 kWh

Sensible heat after the heat recovery, namely, sensible heat derived from the coal-derived gas after the temperature adjustment (cooling) can be utilized as follows. Specifically, assuming that income and outcome of heat in and out of the hot desulfurizer is negligible, calorie corresponding to such sensible heat is 0.85×0.31×(450−45)=106 kcal (443 kJ) under the condition that the reference temperature of recirculating gas is 45° C.

When the sum of the electric power (=0.059 kWh) and the calorie (=106 kcal) is converted to calorie (=6500 kcal) per kg of dried coal, heat corresponding to (0.059×860/0.35+106)/6500=0.039 kg of dried coal per kg of reduced iron is recovered when the power generation efficiency is 35%.

Figure 4:
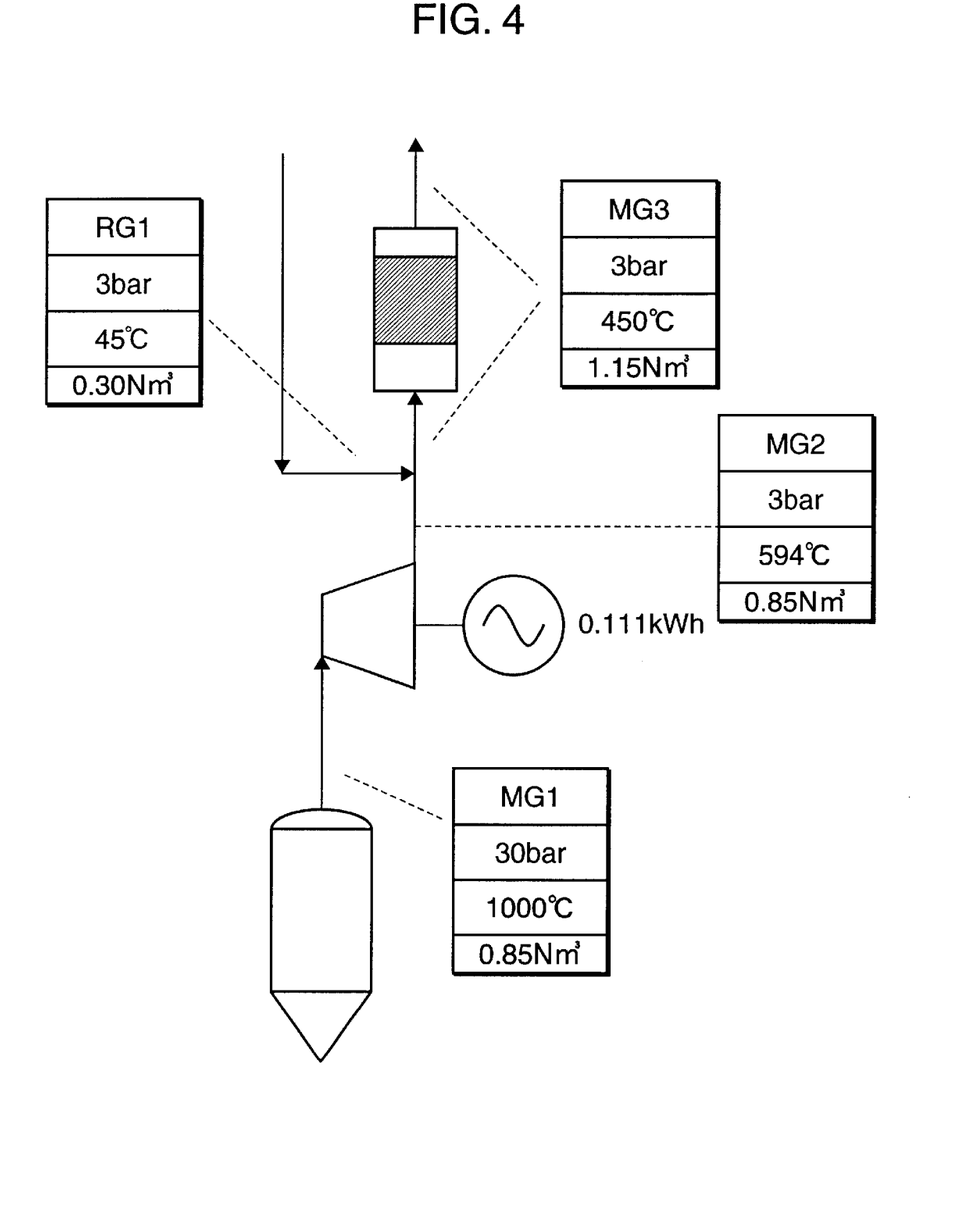
FIG. 4 is a diagram showing a series of processes for utilizing waste heat derived from coal-derived gas as an inventive example.

② Heat balance according to the inventive method (Inventive Example 1) is described with reference to FIG. 4. In the Inventive Example 1, coal-derived gas is depressurized by an expansion turbine and mixed with recirculating gas for temperature adjustment (cooling) to recover heat. Similar to the Comparative Example, in the Inventive Example 1, flow rate of coal-derived gas is 0.85 Nm$^3$, temperature thereof is 1000° C., and temperature of performing hot desulfurization is 450° C. The following equations are used for power calculation and temperature calculation. Specifically, equation for calculating power necessary for compression is Equation 1, and equation representing a relation between temperature and pressure with respect to gas drawing and gas emitting is Equation 2.

$H$=adiabatic power/adiabatic efficiency $$=98/\eta \times r \times P_1 Q_1 [(P_2/P_1)^{(1/r)}-1] \quad (1)$$

$$T_2 = T_1 \times (P_2/P_1)^{(1/r)} \quad (2)$$

where H is power (kW) required for compression, T is temperature (K), P is gas pressure (bar), Q is gas flow rate (m$^3$/sec), r=k/(k−1), k is ratio of specific heat, η is adiabatic efficiency (—), wherein η=0.65, P1 is pressure when gas is drawn in, and P2 is pressure when gas is emitted. The value of specific heat k ranges from 1.3 to 1.5 when gas is compressed, and the specific heat k is about 1.2 when gas is expanded.

The temperature of coal-derived gas (MG2) after power recovery as well as depressurizing by an expansion turbine is (1000+273)×(3/30)$^{(1.20-1)/1.20}$=867K=594° C.

According to the aforementioned equation, the flow rate of recirculating gas RG1 (temperature: 45° C.) which is required for adjusting temperature of coal-derived gas (MG2) to 450° C. is 35% of that of the coal-derived gas (MG2). Since the flow rate of the coal-derived gas (MG2) is 0.85 Nm$^3$, power to be recovered is 0.85×0.31×(1000−594)/(860/0.9)=0.111 kWh when the specific heat of gas is 0.31 kcal/Nm$^3$ deg, and the power generation efficiency of the expansion turbine is 90%.

Sensible heat expected to be derived from the coal-derived gas (MG2) for utilization is 0.85×0.31×(594−45)=145 kcal (607 kJ) when the reference temperature of the recirculating gas is 45° C.

The sum of the electric power to be recovered (=0.111 kWh) and the usable calorie of the sensible heat (=145 kcal) is converted to (0.111×860/0.35+145)/6500=0.064 kg of dried coal per kg of reduced iron when the power generation efficiency is 35%, which is a general power generation efficiency of a coal fired power plant. This means that 0.064 kg of dried coal is required for producing 1 kg of reduced iron.

Figure 5:
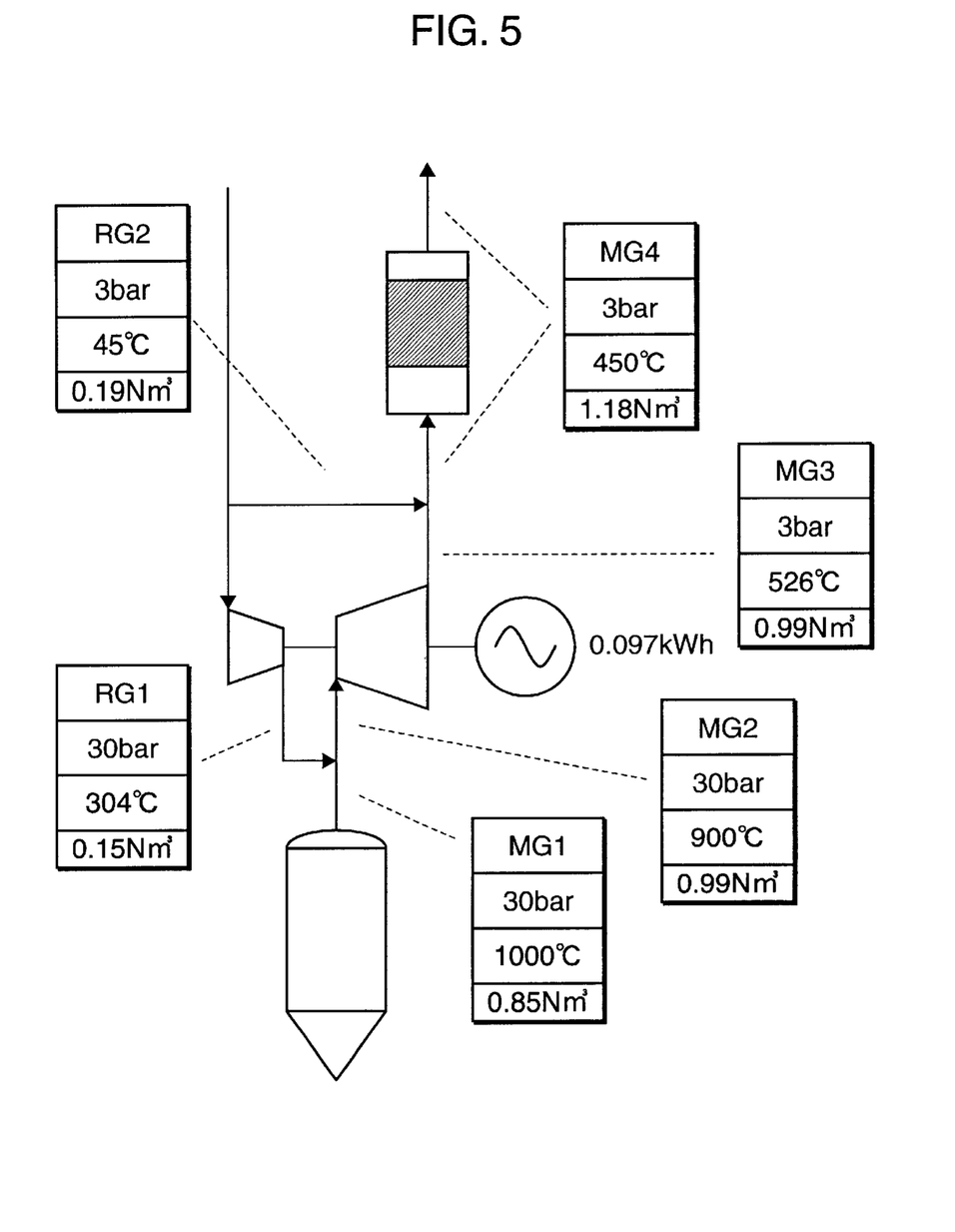
FIG. 5 is a diagram showing a series of processes for utilizing waste heat derived from coal-derived gas as another inventive example.

③ Heat balance according to the inventive method (Inventive Example 2) is described with reference to FIG. 5. In the Inventive Example 2, coal-derived gas is mixed with recirculating gas to lower the temperature of the coal-derived gas to 900° C. Thereafter, the cooled coal-derived gas is depressurized by the expansion turbine, and then mixed with recirculating gas for temperature adjustment. Thus, heat is recovered.

Compression (raising pressure) of recirculating gas (RG1) is required prior to mixing with the coal-derived gas. The temperature of the recirculating gas after pressure raise is (273+45)×(30/3)$^{(1.35-1)1.35}$=577 K=304° C.

As a result, in the Inventive Example 2, flow rate of the recirculating gas RG1 (temperature: 304° C.) which is necessary for lowering the temperature of the coal-derived gas (MG1) from 1000° C. to 900° C. is 17% of that of the coal-derived gas (MG1). As a result, the flow rate of mixed gas of RG1 and MG1, namely, coal-derived gas (MG2) containing the recirculating gas RG1 is 0.85×1.17=0.99 Nm$^3$. The temperature of coal-derived gas (MG3) containing the recirculating gas RG1 after depressurizing by the expansion turbine and power recovery is (900+273)×(3/30)$^{(1.20-1)/1.20}$=799 K=526° C.

Thus, an apparent power to be recovered is 0.99×0.31×(900−526)/(860/0.9)=0.120 kWh. On the other hand, the flow rate of the recirculating gas RG1 is 0.85×0.17=0.15 Nm$^3$. The flow rate is converted to a value according to a temperature-pressure state immediately upstream of a compressor shown in FIG. 5 of 0.15/3×318/273=0.058 Am$^3$. Power necessary for compressing the recirculating gas RG1 is 98/0.65×[1.35/(1.35−1)]×3·0.058/3600·[(30/3)$^{(1.35-1)}$ $^{1.35}$−1]=98/0.65×3.85×3·0.058/3600·0.816=0.023 kWh. Consequently, actual power to be recovered is 0.120−0.023=0.097 kWh.

Sensible heat expected to be derived from the coal-derived gas (MG3) for utilization is 0.99×0.31×(526−45)=147 kcal (615 kJ) when the reference temperature of the recirculating gas is 45° C.

The sum of the electric power to be recovered (=0.097 kWh) and the usable calorie of the sensible heat (=147 kcal) is converted to (0.097×860/0.35+147)/6500=0.059 kg of dried coal per kg of reduced iron when the power generation efficiency is 35%, which is a general power generation efficiency of a coal fired power plant. ④ The results of the examples ① through ③ (results of experiments using the systems shown in FIGS. 3 through 5) are shown in Table 2. As is obvious from Table 2, implementing the inventive method is advantageous in efficiently utilizing waste heat derived from coal-derived gas.

TABLE 1

|  | Coal | Coal 1 | Coal 2 | Coal 3 |
|---|---|---|---|---|
| Feed | Moisture | 43% | 20% | 10% |
|  | Oxygen Consumption Amount *1 | 1.478 | 1.2 | 1.13 |
| Product | CO | 20% | 39% | 49% |
|  | $H_2$ | 20% | 25% | 25% |
|  | $CO_2$ | 20% | 14% | 9% |
|  | $H_2O$ | 32% | 14% | 8% |
|  | $H_2/CO$ | 1.01 | 0.63 | 0.52 |
|  | $(CO + H_2)/(CO_2 + H_2O)$ | 0.76 | 2.35 | 4.2 |
|  | ① $CO + CO_2$ | 39% | 53% | 58% |
|  | ② $CO + H_2$ | 40% | 64% | 74% |
|  | ③ = ①/② | 99.1% | 82.3% | 78.8% |

[Note]
*1 kg of $O_2$/kg of carbon

TABLE 2

| Example | Recycled Electric Power (kwh) *1 | Usable sensible Heat (kcal) *1, *2 | Sum (in terms of coal) (kg) *1 | Remarks |
|---|---|---|---|---|
| Comparative Ex | 0.059 | 106 (443) | 0.039 | Boiler |
| Inventive Ex. 1 | 0.111 | 145 (606) | 0.064 | Turbine of 1000° C. |
| Inventive Ex. 2 | 0.097 | 147 (615) | 0.059 | Turbine of 900° C. |

Note)
*1 value per 1 kg of reduced iron
*2 value in the bracket in terms of kJ (unit)

As described above, according to the direct reduced iron producing method of this invention, heat efficiency is improved with the result that economical efficiency can be enhanced. More specifically, provided is utilization of waste heat derived from top gas of a reducing furnace (exhaust gas from an iron ore reducing furnace) and/or coal-derived gas (synthesis gas generated in a coal gasification furnace, i.e., synthesis gas produced by gasification of coal), thereby improving heat efficiency. Waste heat derived from top gas of a reducing furnace is utilized for adjusting moisture of coal. Thereby, coal having a low carbonization and a high moisture can be used after adjusting its moisture, as well as securing heat efficiency. The inventive method is advantageous in efficiently utilizing waste heat derived from coal-derived gas even in the case where a pressure in the gasification furnace is higher than a normal operation pressure.

This application is based on patent application No. 2000-340461 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A method of producing direct reduced iron with use of a coal-derived gas, comprising steps of:

heating coal to lower the moisture of the coal;

gasifying the moisture-lowered coal in a coal gasification furnace to produce a coal-derived gas containing a reducing gas; reducing iron ore by utilizing the reducing gas in an iron ore reducing furnace; and delivering exhaust gas from the iron ore reducing furnace to the coal to be heated wherein, in the step of heating coal, the coal is heated with heat from the exhaust gas from the iron ore reducing furnace.

2. A method of producing direct reduced iron according to claim 1, wherein the coal-derived gas is depressurized by a power recovery apparatus and the depressurized coal-derived gas is fed to the iron ore reducing furnace.

3. A method of producing direct reduced iron according to claim 2, wherein, the exhaust gas from the iron ore reducing furnace that has been used for the lowering coal moisture is purified by removing non-reducing gas therefrom to obtain a recirculating gas and part of the recirculating gas is mixed with the depressurized coal-derived gas prior to being fed to the iron ore reducing furnace.

4. A method of producing direct reduced iron according to claim 2, wherein the depressurized coal-derived gas is subjected to hot desulfurization prior to being fed to the iron ore reducing furnace.

5. A method of producing direct reduced iron according to claim 3, wherein the mixed gas of the depressurized coal-derived gas and the recirculating gas is subjected to hot desulfurization prior to being fed to the iron ore reducing furnace.

6. A method of producing direct reduced iron according to claim 2, wherein the exhaust gas from the iron ore reducing furnace that has been used for the lowering coal moisture is purified by removing non-reducing gas therefrom to obtain a recirculating gas and part of the recirculating gas is mixed with the coal-derived gas prior to being depressurized.

7. A method of producing direct reduced iron according to claim 1, wherein, in the step of heating coal, the coal is heated by a direct contact with the exhaust gas from the iron ore reducing furnace.

8. A method of producing direct reduced iron according to claim 1, wherein the exhaust gas from the iron ore reducing furnace heats another gas due to a heat exchange therebetween and, in the step of heating coal, the coal is heated by a contact with the heated another gas.

9. A method of producing direct reduced iron according to claim 1, wherein the exhaust gas from the iron ore reducing furnace is purified by removing non-reducing gas therefrom to obtain a recirculating gas, part of the recirculating gas is used as a fuel in a reheating furnace for reheating of the coal-derived gas so as to feed the reheated coal-derived gas to the iron ore reducing furnace and, in the step of heating coal, the coal is heated by a contact with a gas exhausted from the reheating furnace.

10. A method of producing direct reduced iron with use of a coal-derived gas comprising steps of:

gasifying coal in a coal gasification furnace to produce a coal-derived gas containing a reducing gas;

depressurizing the coal-derived gas by a power recovery apparatus; and reducing iron ore by utilizing the reducing gas in the depressurized coal-derived gas in an iron ore reducing furnace.

11. A system for producing direct reduced iron with use of a coal-derived gas comprising:

a moisture adjuster which lowers the moisture of coal;

a coal gasification furnace which gasifies the moisture-lowered coal to produce a coal-derived gas containing a reducing gas;

an iron ore reducing furnace which reduces iron ore by utilizing the reducing gas; and an exhaust gas utilizer which receives an exhaust gas from the iron ore reducing furnace and utilizes heat from the exhaust gas from the iron ore reducing furnace for lowering the coal moisture.

12. A system for producing direct reduced iron according to claim 11, further comprising a power recovery apparatus provided between the coal gasification furnace and the iron ore reducing furnace for depressurizing the coal-derived gas.

13. A method of producing direct reduced iron according to claim 12, wherein the power recovery apparatus includes an expansion turbine.

14. A system for producing direct reduced iron according to claim 11, wherein the exhaust gas utilizer includes a gas passage which allows the exhaust gas to flow into the moisture adjuster from the iron ore reducing furnace.

15. A system for producing direct reduced iron according to claim 11, wherein the exhaust utilizer includes a heat exchanger which transfers the heat of the exhaust gas to another gas and a gas passage which allows the another gas to flow into the moisture adjuster from the heat exchanger.

16. A system for producing direct reduced iron according to claim 12, further comprising:

a gas cleaner which purifies the exhaust gas from the iron ore reducing furnace that has been utilized by the exhaust gas utilizer;

a mixer which mixes the coal-derived gas depressurized by the power recovery apparatus with part of the cleaned gas;

a desulfurizer which desulfurizes the mixed gas;

a reheating furnace which heats the desulfurized gas; and a gas supplier which supplies the heated gas into the iron ore reducing furnace.

17. A system of producing direct reduced iron according to claim 12 further comprising:

a gas cleaner which purifies the exhaust gas from the iron ore furnace;

a mixer which mixes the coal-derived gas depressurized by the power recovery apparatus with part of the cleaned gas;

a desulfurizer which desulfurizes the mixed gas;

a reheating furnace having a burner, in which the desulfurized gas is heated by the heat from the burner; and a gas supplier which supplies the heated gas into the iron ore reducing furnace, wherein the exhaust gas utilizer includes:

a first gas piping which allows another part of the cleaned gas to flow from the gas cleaner into the burner of the reheating furnace so as to use the another part of cleaned gas as a fuel; and a second gas piping which allows a gas exhausted from the reheating furnace to flow from the reheating furnace into the moisture adjuster.

18. A system for producing direct reduced iron according to claim 12 further comprising:

a gas cleaner for purifying the exhaust gas from the iron ore furnace that has been utilized by the exhaust gas utilizer;

a mixer which mixes the coal-derived gas produced in the coal gasification furnace with part of the cleaned gas; and a gas supplier which supplies the mixed gas into the power recovery apparatus.

19. A system for producing direct reduced iron with use of a coal-derived gas comprising:

a coal gasification furnace which gasifies coal to produce a coal-derived gas containing a reducing gas;

a power recovery apparatus which depressurizes the coal-derived gas; and an iron ore reducing furnace which reduces iron ore by utilizing the depressurized gas.

* * * * *